Figure 1:
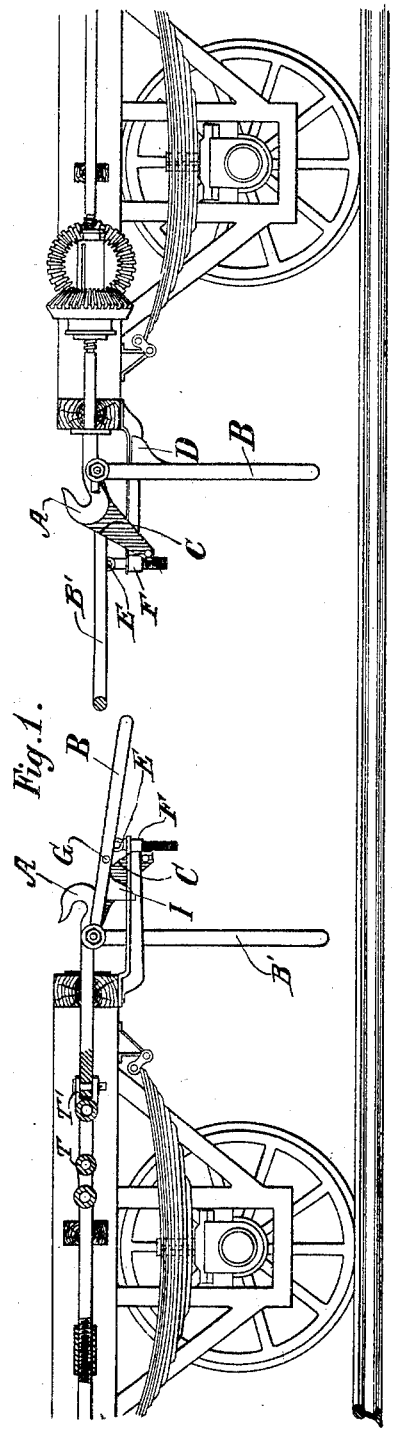

(No Model.) 6 Sheets—Sheet 1.

A. STEIN.
CAR COUPLING.

No. 503,503. Patented Aug. 15, 1893.

Witnesses
J. A. Saul.
J. W. Rea.

Inventor
Arthur Stein
by James L. Norris
Atty.

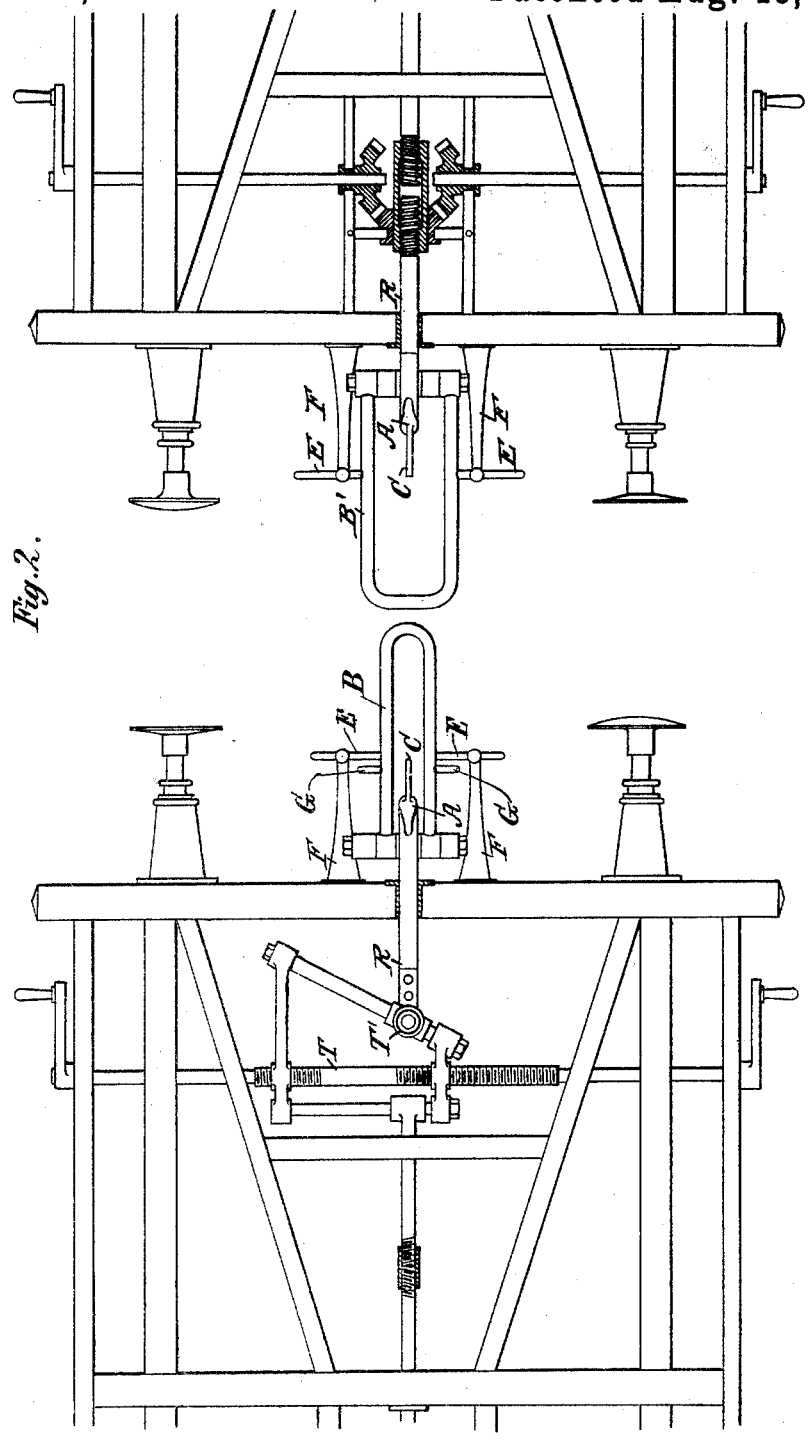

(No Model.) 6 Sheets—Sheet 3.
A. STEIN.
CAR COUPLING.
No. 503,503. Patented Aug. 15, 1893.
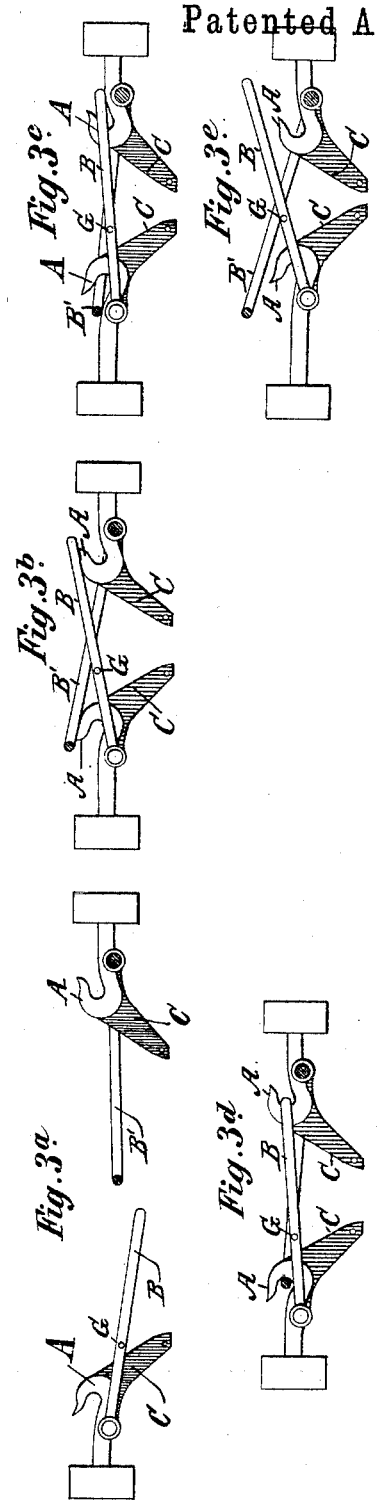
Witnesses
J. A. Saul.
J. W. Rea.
Inventor
Arthur Stein
by James L. Norris
Atty

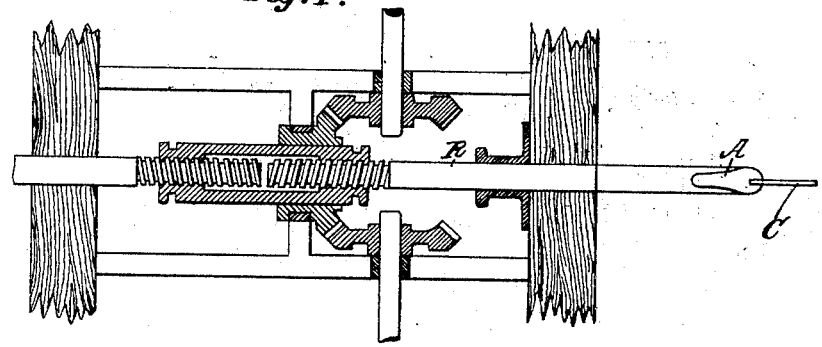
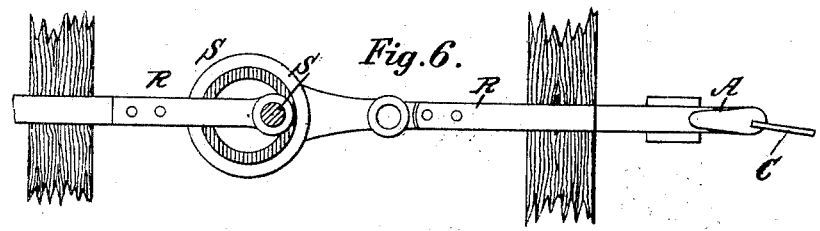
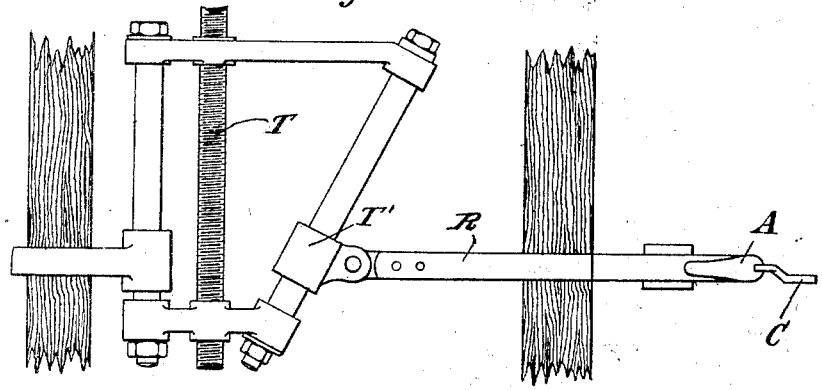
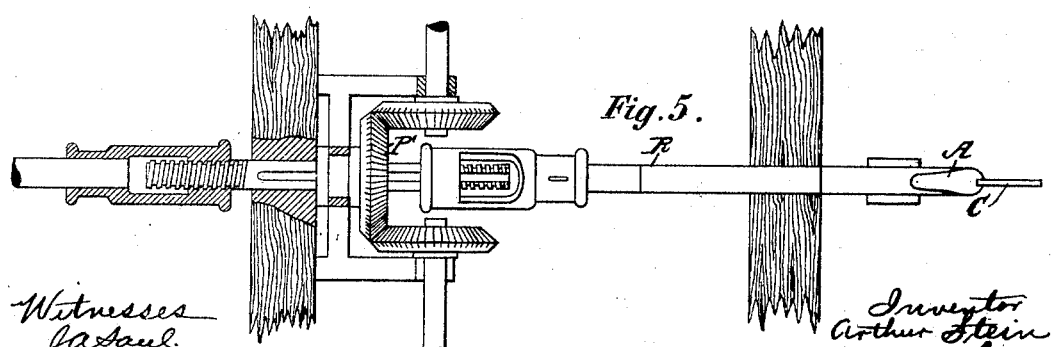

(No Model.) 6 Sheets—Sheet 5.
A. STEIN.
CAR COUPLING.
No. 503,503. Patented Aug. 15, 1893.
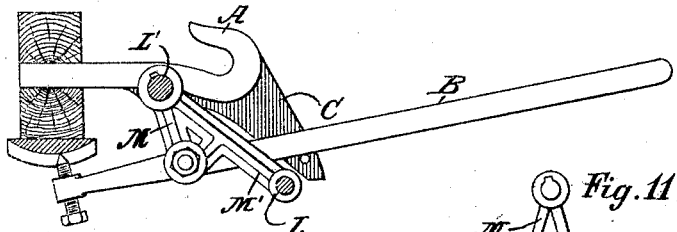
Fig. 11.
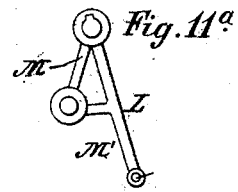
Fig. 11ª.
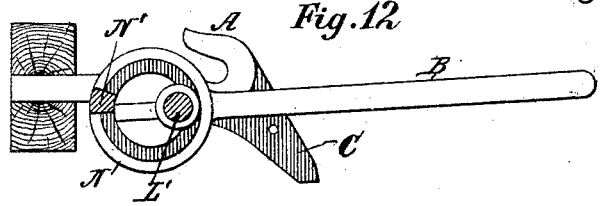
Fig. 12.
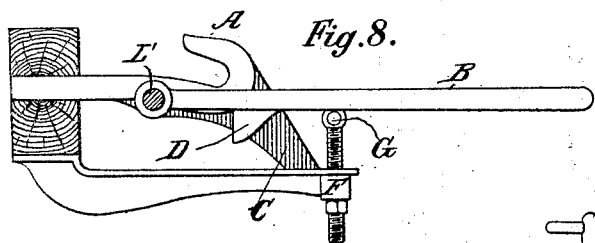
Fig. 8.
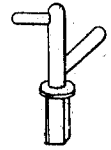
Fig. 8ª.
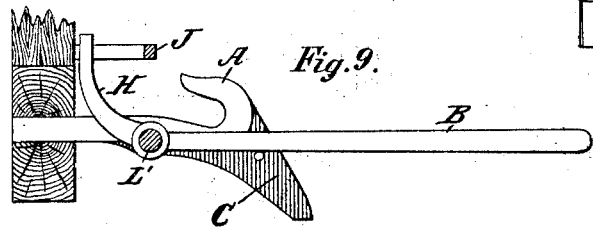
Fig. 9.
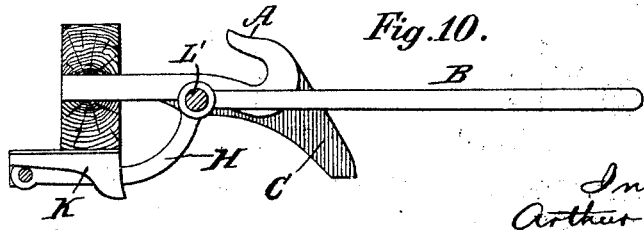
Fig. 10.
Witnesses
J. A. Saul
J. W. Rea.
Inventor
Arthur Stein
by James L. Norris
Atty.

(No Model.) 6 Sheets—Sheet 6.
A. STEIN.
CAR COUPLING.
No. 503,503. Patented Aug. 15, 1893.
Fig. 13.
Fig. 14.ª
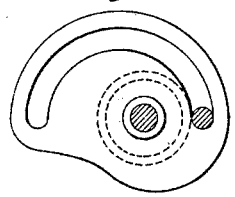
Fig. 14.ᵇ
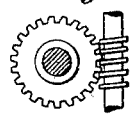
Fig. 15.ª
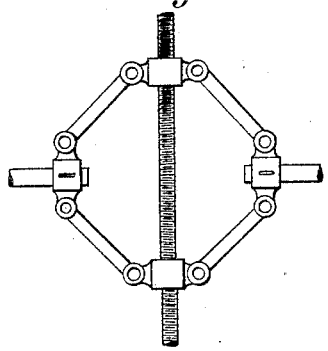
Fig. 15.ᵇ
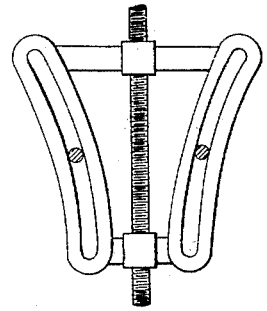
Fig. 16.
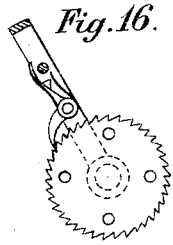
Fig. 17.
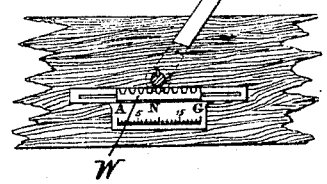
Witnesses
J. A. Saul.
G. W. Rea.
Inventor
Arthur Stein
by James L. Norris
Atty

UNITED STATES PATENT OFFICE.

ARTHUR STEIN, OF SCHÖNPRIESEN, NEAR AUSSIG, AUSTRIA-HUNGARY.

CAR-COUPLING.

SPECIFICATION forming part of Letters Patent No. 503,503, dated August 15, 1893.

Application filed March 22, 1893. Serial No. 467,228. (No model.)

*To all whom it may concern:*

Be it known that I, ARTHUR STEIN, engineer, of Schönpriesen, near Aussig, in the Kingdom of Bohemia and Austro-Hungarian Empire, have invented new and useful Improvements in Self-Acting Railway-Car Couplings, of which the following is a specification, reference being had therein to the accompanying drawings.

This invention relates to automatic duplex couplings for railway carriages and similar vehicles, its object being to provide means by which such vehicles may be automatically and safely coupled together while at the same time the clumsiness and complications existent in previous couplings of this type are completely obviated.

In its essential form a coupling constructed according to this invention consists of two links or hooks of different widths pivoted one to each end of the vehicle in such a manner that upon the carriages being forced together the forward ends of the links come upon inclined planes on the coupling hooks or draw bars and are thereby simultaneously lifted up and carried over the hooks to engage therewith, the narrower link passing through the wider one for the purpose. The links then fall by gravity and engage with the hooks.

This coupling is sufficient for some purposes, such for example as the coupling of goods wagons, but the coupling may be secured up if desired by moving the coupling hooks or draw bars longitudinally relatively to the carriages and away from one another. To disengage the coupling the draw bars are advanced or the carriages are forced together when the coupling links are lifted free of the hooks.

In the accompanying drawings reference to which is hereinafter made, Figure 1 is an elevation of the opposed ends of two vehicles furnished with the improved coupling apparatus, the various parts being in the uncoupled position. Fig. 2 is a plan of Fig. 1. Figs. $3^a$, $3^b$, $3^c$, $3^d$, $3^e$ show the positions assumed by the various parts during the operation of coupling and uncoupling. Fig. 4 illustrates mechanism by which the coupling hook or draw bar may be moved longitudinally. Figs. 5, 6, 7, $14^a$ $14^b$ and $15^a$ $15^b$ represent modifications of and substitutions for the mechanism illustrated by Fig. 4. Figs. 8, $8^a$ 9 and 10 show the details by means of which the coupling links are lifted upon the longitudinal movement of the coupling hook. Figs. 11 $11^a$ and 12 are illustrations of modified forms of the lifting apparatus. Fig. 13 shows an arrangement of hooks in substitution for the coupling rings. Fig. 16 illustrates apparatus for arresting the motion of the driving spindle; and Fig. 17 is a view of an indicator by means of which the positions of the various parts of the coupling are plainly shown.

As shown in the drawings each coupling hook A has two rings or links of different widths hinged to it, one of which, B, is the draft link and the other, B', is a safety or reserve link. Of the opposing links one as shown in Fig. 2 is considerably wider than the other. To effect the coupling the carriages are moved together or one of the draw-bars is advanced.

Referring to Figs. $3^a$ to $3^e$ in which the positions assumed by the coupling links during coupling or uncoupling are plainly shown, it will be seen that upon the approach of the carriages or of the draw bars, the forward ends of the coupling links engage with inclined projections C formed on the forward ends of the coupling hooks A. In Fig. $3^a$ the coupling is separated; in Fig. $3^b$ the hooks have approached the ends of the links, have passed up the inclined planes on the projections C, and are about to fall over and engage with the hooks A the narrower link passing through the broader. In Fig. $3^c$ the links have passed over the hooks and form a loose coupling; and in Fig. $3^d$ the coupling has been finally tightened as for use in a passenger train owing to the separation of the coupling hooks by mechanism which will be hereinafter described. To disconnect the coupling the draw bars are advanced and the links are loosened as shown in Fig. $3^e$ and then lifted as illustrated by Fig. $3^e$. To effect the lifting and disengagement of the links by transforming the forward movement of the links into an upward movement the apparatus illustrated by Figs. 8, 9 and 10 may be employed.

As shown in Fig. 8 and also in Fig. 1, the narrower link B is formed with a projection D, which upon the relative movement of the draw bar to the body of the carriage engages with a pin E, secured to the adjustable bracket F. The link is then lifted and at the same time lifts the broader link by means of the two laterally projecting pins G. Both links are thus lifted free of the hooks and the vehicles may be separated. Alternately the pin E may be formed on the link and the projection D on the bracket.

In Fig. 9 another arrangement is illustrated for lifting the link. Upon the longitudinal forward movement of the draw bar a suitably formed upward projection H at the rear end of the link engages with an arm or bracket J secured to the frame of the vehicle and tilts the link upward. In Fig. 10 the projecting arm H curves downward and moves in contact with the inclined plate K. Another method of raising the links is to fasten it by a short chain to some part of the carriage above it so that on being moved forward it is swung upward around its pivot. The links thus being raised it is only necessary to separate the vehicles.

In the case of a coupling for lightly laden vehicles, the apparatus illustrated by Figs. 11 and 12 may be employed. In Fig. 11 a two-armed lever L shown separately in Fig. 11$^a$ is secured to a shaft L' upon the rotation of which the shorter arm M of the lever effects the forward movement of the link, and upon further rotation the longer arm M' effects the lifting. In Fig. 12 the shaft L' carries an eccentric N furnished with a projection N' which upon rotation lifts the link B after the completion of the longitudinal motion. In these modifications the link moves relatively to the draw bar which is rigid.

As shown in Fig. 13 the hinged links are replaced by hooks which are similar. In all these cases it is only necessary to provide means for raising the narrower link, as this engages by means of the lateral pins G with the broader link and consequently raises it. If desired however the links may be operated and raised separately.

Instead of having both links of the coupling of the same length so that they are both in tension, the broader link may be longer than the other so as to form an emergency coupling in case of any breakage of the first. The front end of the broader link is preferably formed to the arc of a circle the radius of which is the length of the link so that curves may be safely and easily passed over.

In order that the inclined projections C on the coupling hooks A may be long enough to adapt themselves to various heights of vehicles without coming into contact with one another they may be cranked or otherwise formed out of the plane of the draw bars as illustrated in Figs. 6 and 7.

Various forms of mechanism for imparting longitudinal motion to the draw arc are illustrated by Fig. 4, 5, 6, 7, 14$^a$ 14$^b$ and 15$^a$ 15$^b$. This mechanism is preferably placed under the carriage, where access may easily be obtained for purposes of examination and repair, and may be operated from the side of the carriage, from the roof, or from the interior.

In the form shown in Fig. 4, shafts O from either side of the carriage carry bevel wheels P which gear with a wheel P' the eye of which is screwed upon the draw bar R. Upon the rotation of the shafts in one direction or the other the draw bar is moved in one direction or the other. As shown in the drawings the nut is double and simultaneously operates the bar R' which is attached to the usual draft spring.

In Fig. 6 the draw bar R is operated by an eccentric S mounted on the shaft S'. This eccentric may be substituted by a disk or double disks with volute curves as illustrated by Fig. 14$^a$ operated by a worm and worm wheel Fig. 14$^b$.

Another form illustrated by Figs. 7 and 2, consists of a trapezium suitably supported and moved by a screw T. A suitable socket T' secured to the draw bar embraces one side of the trapezium and effects the longitudinal motion. Instead of the trapezium the modifications shown in Figs. 15$^a$ and 15$^b$ may be employed.

In Fig. 5 the bevel wheel P' instead of forming a nut carries a shaft which is screwed and engages with nuts on the ends of the draw bars and spring rod.

It is perfectly obvious that numberless modifications of my apparatus for imparting these longitudinal and upward motions to the coupling links may be employed without departing from the spirit of this invention.

An essential feature of this coupling which has been absent from previous automatic couplings is that the standard coupling hook is retained without the addition of any locking or safety device to prevent the link escaping. As a precaution however the hook may be returned horizontally to a greater distance than is at present usual.

In order to lock the apparatus and thus prevent any accidental uncoupling the operating shaft may carry a ratchet wheel V Fig. 16 which engages with a suitable detent.

So that the position of the coupling may be easily seen in dark and foggy weather the operating shaft carries a pinion which gears with a rack W carrying a pointer moving over a scale as shown in Fig. 17.

The coupling together of carriages is thus effected as follows: They are moved together at a moderate speed as is done at present, and a loose connection is formed through the links passing up the inclined plane of the hooks. The coupling is then tightened by rotating one of the operating shafts moving the draw bar. The opposite rotation of course effects the uncoupling. The buffer springs maintain the proper degree of tension in the coupling.

I claim—

1. A duplex automatic coupling for railway and similar vehicles consisting of hinged or pivoted links or rings of different widths which come into contact with and pass up inclined planes formed on the coupling hooks and engage therewith upon two carriages being moved together, constructed and arranged substantially as hereinbefore described and as illustrated by the accompanying drawings.

2. In a duplex automatic coupling for railway and other vehicles the combination with a draw bar capable of longitudinal movement of pivoted links, rings, or their equivalents and suitable projections or inclined planes for moving the pivoted links upward; all constructed and arranged substantially as hereinbefore described and as illustrated by the accompanying drawings.

3. A duplex automatic coupling for railway and other vehicles consisting of longitudinally movable draw bars, coupling hooks formed with inclined planes, pivoted links or rings, apparatus for lifting these links or rings, for uncoupling, and apparatus for imparting longitudinal motion to the draw bars; all arranged constructed and operated substantially as hereinbefore described and as illustrated by the accompanying drawings.

4. The combination with the duplex automatic coupling herein described of an indicating device, substantially as hereinbefore described.

In witness whereof I have hereunto set my hand in presence of two witnesses.

ARTHUR STEIN.

Witnesses:
PAUL FISCHER,
PAUL BRINKMANN.